United States Patent [19]
Bollinger, Jr. et al.

[11] 3,916,133
[45] Oct. 28, 1975

[54] OPTICAL INDICATOR FOR ENCLOSED OPERATING MECHANISM

[75] Inventors: Parker A. Bollinger, Jr., Franklin; Roland L. Krieger, Milwaukee, both of Wis.

[73] Assignee: Allen-Bradley Company, Milwaukee, Wis.

[22] Filed: Apr. 22, 1974

[21] Appl. No.: 462,909

[52] U.S. Cl......... 200/308; 116/124 L; 200/DIG. 47; 340/380
[51] Int. Cl.² ......................................... H01H 9/16
[58] Field of Search............ 200/DIG. 47, 308, 310, 200/317; 116/124 L; 340/380

[56] References Cited
UNITED STATES PATENTS

| | | | |
|---|---|---|---|
| 2,616,941 | 11/1952 | Lasko | 340/380 |
| 3,377,451 | 4/1968 | Kreuter | 200/308 |
| 3,653,136 | 4/1972 | Ruppert | 200/DIG. 47 |
| 3,755,661 | 8/1973 | Bouvrande | 200/DIG. 47 |
| 3,769,477 | 10/1973 | Chabala et al. | 200/308 X |

Primary Examiner—Robert K. Schaefer
Assistant Examiner—William J. Smith
Attorney, Agent, or Firm—Arnold J. Ericsen

[57] ABSTRACT

An optical indicator for observing relative movement between a device enclosed within a housing and the indicator. The indicator is continuous throughout its length and characterized in transmitting incidental light rays from a source, such as ambient light, externally of an enclosed housing into said housing and transmitting light rays from a reflecting surface area on the enclosed device when the reflecting surface area is moved to a position transversely relative to incidental light rays. A specific application resides in detecting operation of electric contacts.

4 Claims, 11 Drawing Figures

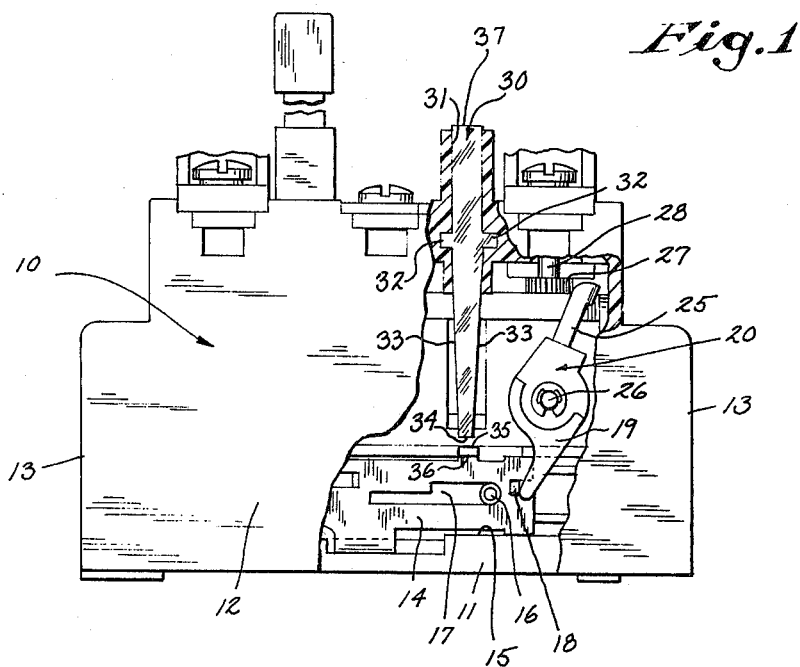
Fig.1
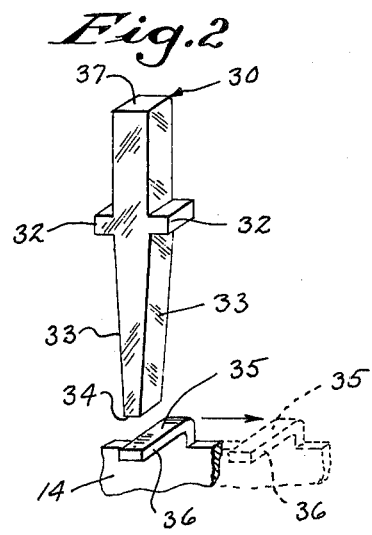
Fig.2
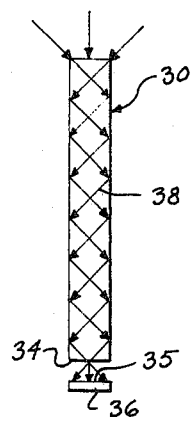
Fig.3
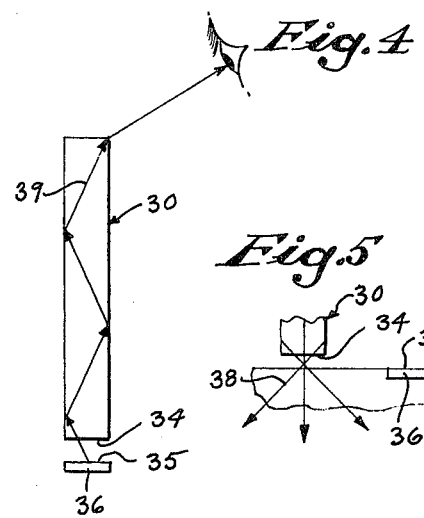
Fig.4
Fig.5
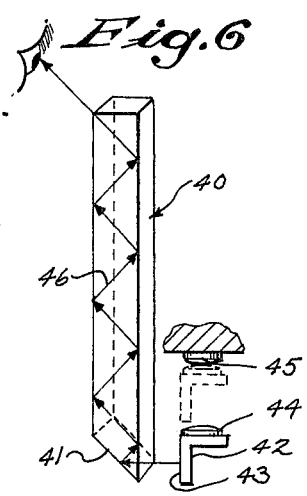
Fig.6
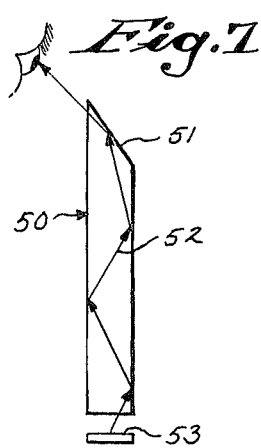
Fig.7
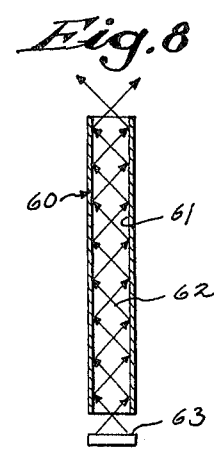
Fig.8

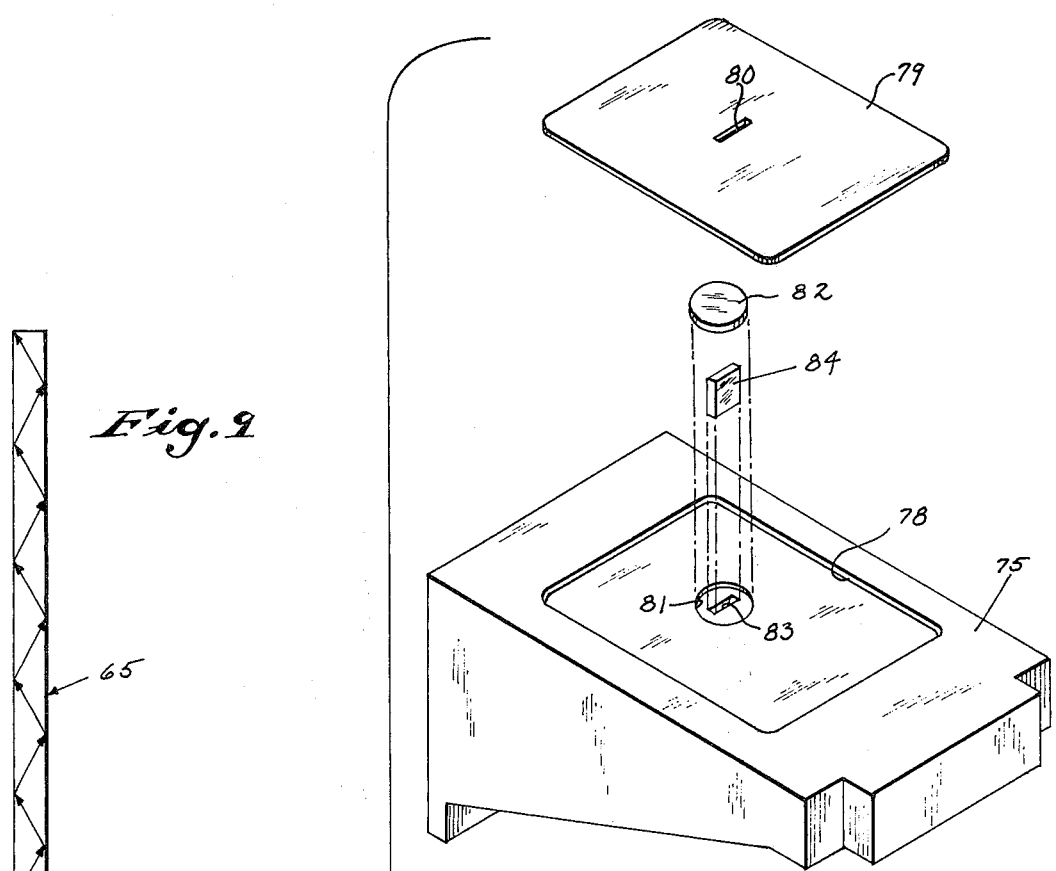
Fig. 9
Fig. 11
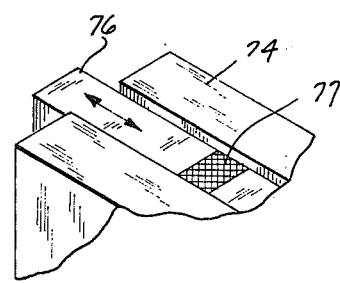
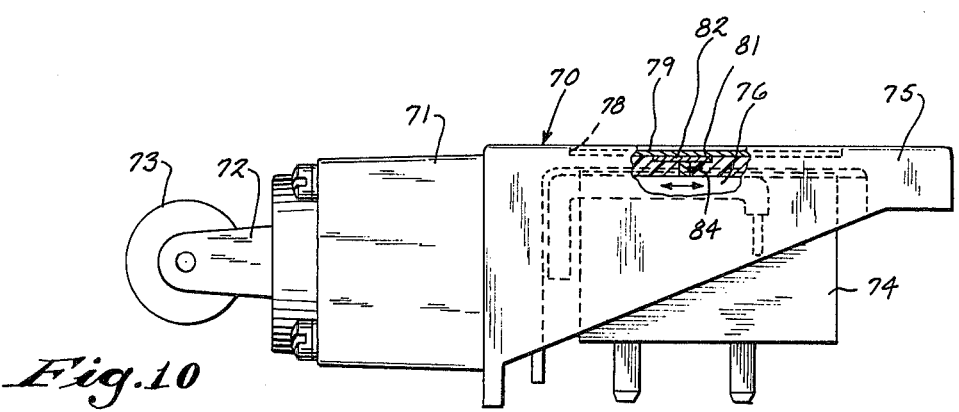
Fig. 10

OPTICAL INDICATOR FOR ENCLOSED OPERATING MECHANISM

BACKGROUND OF THE INVENTION

The field of the invention relates to visual observation of relative movement of mechanism located internally of an enclosed housing, and specifically to a means for externally observing the operation of mechanism enclosed in a housing, such as the position of a movable electrical contact relative to a stationary contact, or of operating means for moving said electrical contact.

In the specifically mentioned field of use there have been prior art devices for indicating relative position of a movable contact with respect to a stationary contact. One example may be found in U.S. Pat. No. 3,223,803 granted to Robert E. Walters on Dec. 14, 1965 and in which there is disclosed a mechanically actuated, axially movable indicator for "visual observation" of an enclosed operating mechanism. Several moving parts including a cam surface, a spring-return mechanism, guide slots and pins are required for this type of mechanism. Such mechanism necessitates additional compensation of spring operators, particularly when a multipole relay is involved. Another patent providing "visual observation" of a switch mechanism was granted to W. A. DeSmidt on Feb. 2, 1965 and bears U.S. Pat. No. 3,168,636. In the case, the design required two neon bulbs and accompanying electric circuitry. Both of these patents are assigned to the assignee of the present patent application.

Optical indicators functioning in somewhat similar fashion to the device presently disclosed have been illustrated in other patents: namely, (1) Liquid Level Indicators, U.S. Pat. No. 2,468,833 issued to Murphy on May 3, 1949, U.S. Pat. No. 3,272,174 issued to Pribonic on Sept. 13, 1966, U.S. Pat. No. 3,384,885 issued to Forbush on May 21, 1968 and U.S. Pat. No. 3,448,618 issued to Lomolino on June 10, 1969; (2) Indicating Devices With A Light Source Is Contained Interiorly Of An Enclosure, U.S. Pat. No. 2,678,431 issued to Lewis on May 11, 1954, U.S. Pat. No. 3,594,754 issued to Doshall on July 20, 1971, U.S. Pat. No. 3,647,986 issued to Lace et al. on Mar. 7, 1972 and U.S. Pat. No. 3,744,045 issued to Frink et al. on July 3, 1973; (3) Endoscopic Type Indicators, U.S. Pat. No. 2,746,450 issued to Lady et al. on May 22, 1956, U.S. Pat. No. 3,357,433 issued to Fourestier et al. on Dec. 12, 1967 and U.S. Pat. No. 3,724,922 issued to Jones on Apr. 3, 1973; (4) "Shutter" Type Device, U.S. Pat. No. 3,594,767 issued to Link on July 20, 1971 and U.S. Pat. No. 3,733,570 issued to Worrall on June 28, 1971. U.S. Pat. No. 3,575,129 issued to Sullivan on Apr. 13, 1971 discloses a device utilizing the fiber optic cable split to provide two paths, one path for receiving light from a specific source, and the other path for transmitting light from a movable device contained in an enclosed housing. The second path terminates in a separate, remotely located indicator panel.

SUMMARY OF THE INVENTION

The present invention relates to means for detecting relative motion between a light transmitting-receiving member and a reflecting surface on another member, wherein the other member is contained within an enclosed housing and the indicator member has a reflective surface for receiving and transmitting light rays externally of the housing. The reflective surface may be the surface of the member itself, or it may be applied to an area by painting, decalcomania, adhesive backed reflectors, or the like. The invention has particular adaptation for use in electrical devices having a contact member alternatively movable into and out of electrical engagement with a stationary contact.

As stated above, mechanically operated indicators have been used heretofore, but such indicators require several operating parts, along with spring returns, guide means and cam surfaces, which obviously add cost to the manufacturer of the electrical device, in addition to introducing added frictional forces which must be compensated for by special spring design. It is well-known that balancing of spirng forces is quite critical and difficult to control. The present invention permits the desired results by the use of a single, integrally formed, indicator member in its preferred embodiment. No additional forces nor additional compensation for such forces are required as were necessary in prior devices.

It is therefore a general object of the invention to provide indicating means for visual observation externally of an enclosed housing of relative movement between an optical indicator member and a member contained within the housing.

Another object of the invention is to provide an integrally formed optical indicator member capable of transmitting light rays from an external ambient source inwardly of an enclosed housing to a reflecting surface area on a member in the housing and to transmit reflected light rays from that reflecting area through the indicator member and outwardly of the housing for visible detection of movement of the reflecting surface.

Another object of the invention is to minimize the number of component parts used in detecting movement within an enclosed housing by visual examination externally of the housing.

A further object of the invention is to provide an optical indicator made of transparent material, or material having a reflecting surface, and in which the indicator may be formed of a number of convenient configurations. The indicator may be an elongated solid member of transparent plastic or glass having light transmitting and/or reflecting surfaces formed at varying angles to permit access to a reflecting surface, or which may be tubular with the inner bore surface being reflective in nature. It is further contemplated that the indicator may be movable or stationary with the reflective surface being alternatively movable or stationary with respect to the indicator.

A still further object of the invention is to provide an optical indicator for visually observing the movement of electrical switch contacts contained within an enclosed housing, or an operator member for actuating the movable contact or contacts of switching devices contained within the housing, such as in limit switch applications, circuit breaker applications, relay applications and the like, where it is desirable to provide an indicator means for detecting the relative position of switch contacts within an enclosed housing.

The foregoing and other objects and advantages of the invention will appear from the following description. In the description, reference is made to the accompanying drawings which form a part hereof, and in which there is shown by way of illustration several embodiments of the invention. Such embodiments do not necessarily represent the full scope of the invention, and reference is made to the claims herein for interpreting the breadth of the invention.

BRIEF DESCRIPTION OF THE DRAWINGS

FIG. 1 is a front view, in elevation, of a protective relay, wherein a portion of the enclosure of the relay is broken away to illustrate the invention as it is used in a particular environment;

FIG. 2 is a perspective view of the indicator member and operating member of FIG. 1 with portions of the operating member being broken away and with movement of the operating member also being shown in phantom and as used in the environment of FIG. 1;

FIGS. 3 and 4 are diagrammatic views illustrating the principles of the present invention, wherein FIG. 3 indicates the transmitted incidental light rays received by the indicator member and being transmitted to a reflecting surface, and wherein FIG. 4 indicates the path of reflected light rays emanating from a reflecting surface as received by the eye;

FIG. 5 is a diagrammatic view, similar to FIGS. 3 and 4 and illustrating transmitted incidental light rays being scattered throughout the interior of a housing when the indicator member or the reflecting surface have been moved relative to one another and out of the path of the incidental light rays;

FIG. 6 is an elevational view, partially in fragment and partly in diagram, illustrating a specific embodiment of the present invention as used with a laterally adjacent member movable in a path parallel with the longitudinal axis of the indicator member;

FIG. 7 is a diagrammatic view of another embodiment of the present invention, depicting a variation in the viewing and light gathering surface of the indicator member;

FIG. 8 is a diagrammatic view of still another embodiment of the present invention, illustrating the indicator device in the form of a tubular member;

FIG. 9 is a side elevational view of an indicator member of the present invention with an operating member adjacent an angularly formed or bent portion of the indicator member;

FIG. 10 is a side elevational view, with parts cut away, of a limit switch embodying the present invention, and FIG. 11 is an exploded view of component parts of the limit switch of FIG. 10.

DESCRIPTION OF THE PREFERRED EMBODIMENTS

Referring to FIGS. 1 and 2 of the drawings, the optical indicating means of the present invention is illustrated with reference to its use in a protective relay of the type having common use in electrical motor control circuits utilizing electro-magnetic line contactors. The various components of a relay of this type are fully disclosed in the aforementioned Robert E. Walters U.S. Pat. No. 3,223,803. The relay is generally designated by the reference numeral 10 and comprises a base 11 arranged to receive an enclosing cover 12. Contact mechanisms are contained in either of the end portions 13, as described in the above-mentioned U.S. Pat. No. 3,223,803. Details of the contact mechanism have not been disclosed, since they are fully described in the mentioned patent and do not form a part of the present invention. A generally rectangular trip member 14 is slidably mounted in the shallow track 15 formed in the base 11. The trip member 14 is guided and limited in its sliding motion both by the track 15 and by pin 16 which is received in the slot 17. There are other pins and slots, but they have not been shown in order to simplify the drawing. The trip member 14 of the present embodiment is somewhat modified from the equivalent member shown in the Walters patent. It utilizes a laterally extending ear 18 for engagement with the operating arm 19 of the trip member 20. Only one of the trip members 20 is shown for purposes of illustrating the present invention. A resilient metal pawl 25 extends from the operating shaft 26 to cooperate with the movement of the member 20 which is also mounted on the shaft 26. The metal pawl is disposed within a complementary recess (not shown) formed in the insulating body of the tripping member 20. Although not specifically shown, the upper end of the pawl engages with a ratchet member 27. In the present protective relay, the ratchet member is mounted on a downwardly extending portion of a stud 28 and is normally prevented from rotation with respect to the stud 28 by means of a film of a heat fusible allow, such as an eutectic solder, occupying the clearance therebetween. When the heat transferred to the stud 28 from a coil (not shown) is sufficient to melt the fusible alloy, the ratchet member 27 will be free to rotate, thus providing an indication of an overload condition.

The trip member 14, the tripping device 20 and the ratchet member 27 are each arranged to cooperate with one another so that when the ratchet member 27 is released to move on the melting of the alloy, the spring pressure exerted on the pawl through the pawl 25 through by means of spring bias (not shown) exerted on the member 20 by means of the ear 18 on the trip member 14 will move each of the member 20 away from the position shown in FIG. 1. The entire movement also is reflected in a set of contacts (not shown) which function to disconnect a line to a motor (not shown), or to connect an audible or visual indicating device, if desired (not shown). The art is well-known, and is merely presented here to provide an environment for illustrating an application of the present invention.

With the above background in mind, it will be apparent that an indicating device for detecting movement of the trip member 14 will be found to be desirable. Such devices are known and, in fact, a mechanically operated device is illustrated and claimed in the aforementioned Walters U.S. Pat. No. 3,223,803. Mechanically operated indicating devices do provide the desired function, viz., visual indication of movement of a member contained within an enclosure, but such devices require several cooperating members, which must be supported in specially designed guideways, cam or link operated members and, of course, additional spring return members. This all adds to additional frictional forces and other factors that effect the operation of a main return spring or other drive element. That is, the mechanical design must take into account compensating means to overcome these factors.

The present invention contemplates the use of a single optical indicating member, and as shown in FIGS. 1 and 2, the indicator member 30 is stationarily seated in an aperture or thru-bore 31 of the cover 12, specifically molded to receive and seat the member 30 with respect to the cover 12. Laterally extending ears 32 serve to further retain the member in place within the cover 12. Although not specifically shown, it will be apparent that the cover 12 may be molded from two mating parts adapted to receive the indicator member 30. In the specific embodiment shown, the indicator member 30 has tapered sides 33 at the lower portion thereof. This particular configuration permits a reduced lower surface 34, which tends to focus incidental and reflecting light rays directly to a reflecting surface 35 on the laterally extending ear 36 integrally formed on the trip member 14. In this case, the upper surface of the ear 36 acts as the reflecting surface. However, it will be apparent that on occasion paint may be applied, or a specially prepared pad of reflecting material may be adhesively attached when desired. The exposed upper surface 37 of the indicator member 30 conjointly provides a means for receiving ambient light and for transmitting such light to the eye of an observer, as will hereinafter be described. It will be apparent from FIG. 2 that the ear 36 will be displaced from its normal position directly below the surface 34 of the indicator member 30 to the phantom position shown in FIG. 2 upon sliding movement of the trip member 14.

FIGS. 3, 4 and 5 are diagrammatic illustrations provided to illustrate the operation of the integrally formed indicator member 30 with respect to the reflecting surface 35. The indicator member may be molded of transparent acrylic material capable of withstanding relatively high temperatures, or may be formed of glass, if desired. Obviously, the invention is not to be considered to be restricted to the material used, and it is contemplated that other transparent materials capable of receiving incidental light and reflecting such light rays may be substituted.

With particular reference to FIG. 3, it will be observed that incidental ambient light rays are transmitted throughout the length of the indicator member 30 to be intercepted by the reflecting surface 35 of the member 36. It will be apparent to those skilled in the art that the diagrammatic representations of FIGS. 3-5, inclusive, are shown under ideal conditions without taking into account the refractive index of the material used. When the member 36 is disposed directly below the surface 34 of the indicator member 30 as shown in FIG. 4, its reflective surface 35 will reflect light rays to the surface 34 and inwardly of the member 30 to be received by the eye of an observer. However, when the member 36 has been displaced laterally of the surface 34 of the member 30, as shown in FIG. 5, the incidental light rays 38 will be scattered interiorly of the enclosed device 10, and no reflected light rays, or an insufficient number of rays, will be transmitted upwardly through the member 30 and externally of the enclosed chamber.

FIG. 6 is illustrative of another embodiment of the present invention and indicates the utilization of an indicator member 40 configured to have its lower surface 41 disposed angularly relative to the cross-sectional plane of the member 40. Thus, a member such as a movable contact 42, movable in a plane parallel with the longitudinal axis of the indicator member 40 may be detected in its motion. The movable contact support 42 has a reflecting surface 43 and a contact 44. The member 42 is movable vertically with respect to FIG. 6 into and out of electrical contact with a stationary contact 45, as shown in the solid and phantom views. In this embodiment, it will be observed that reflected light rays 46 will emanate from the reflected surface 43 directly to the angular surface 41 and inwardly of the indicator member 40 to the eye of the observer through the top surface 47 of the indicator 40.

FIG. 7 illustrates a further embodiment of the invention wherein an indicator member 50 has an angularly disposed upper surface 51 adapted to receive reflected light rays 52 from a reflecting surface 53 directly to the eye of an observer. This device is utilized where the indicator member 50 is situated in a position (not shown) which is more inaccessible for observation than in the usual position of FIGS. 1-4.

FIG. 8 illustrates a further embodiment of the present invention wherein a tubular indicator member 60 has a mirrored or other reflecting surface 61 interiorly of a tube and arranged to transmit and receive light rays 62 when a reflecting surface 63 is disposed directly thereunder.

The embodiment of FIG. 9 is illustrative of an elongate indicator member 65 which is bent intermediate its ends and is arranged to transmit eight rays 68 to a reflective surface 66 on a transversely movable member 67. As above described, movement of the member 67 will cause the surface 66 to intersect with the light rays or to be withdrawn for scattering of the rays.

To further illustrate the versatility of the present invention, the optical indicator means has been adapted for use in a limit switch application, as shown in the views of FIGS. 10 and 11. In the present embodiment, the movable member is disposed in closer proximity to the inner surface of the housing. Thus, the length of the optical indicator is not dependent on the position of the reflecting surface within the enclosure.

The device illustrated in FIGS. 9 and 10 has been clearly defined and claimed in U.S. Pat. No. 3,555,215 issued to William F. Dehn on Jan. 12, 1971 and U.S. Pat. No. 3,769,474 issued to Deubel et al. on Oct. 30, 1973. both of which patents have been assigned to the assignee of the present invention.

The limit switch includes a metal housing designated generally by the reference numeral 70, and operating head 71 atop the housing 70, and actuating arm 72 and a cam roller 73 pivotally attached to the arm 72. The operating mechanism is conventional, and various types of such mechanism are well-known to those skilled in the art so that the mechanism has not been shown, nor will it be described in detail. However, a typical mechanism has been illustrated and claimed in the aforementioned Deubel et al. patent and designated herein by the reference numeral 74. Also, only the mechanism housing portion 75 has been shown for purposes of illustration.

In this case, the mechanical moving member is in the form of the contact actuator 76, the function of which has been fully described in the aforementioned Deubel et al patent. With reference to FIG. 11, it will be apparent that a colored reflective area 77 has been applied to the actuator 76. Also with reference to the exploded view of FIG. 11, it will be observed that the mechanism housing 75 has been formed with a recessed area 78 arranged to receive a rectangular nameplate 79, which may be formed of a thermosetting plastic sheet material, or an aluminum or other metallic stamping. The nameplate 79 includes an aperture 80. It will be further observed that an additional circular recessed area 81 has been formed in the housing 75 to receive a transparent plastic disc 82. An aperture 83 receives the transparent optical indicator element 84 seated therein.

It will now be apparent that transverse movement of the actuator 76 with respect to the indicator member 84 will permit the reflective area 77 to be disposed under the indicator member and receive incidental light rays through the apertured housing and the indicator member 84 and reflect the light rays outwardly through the indicator member, the transparent plastic disc and the aperture 80 of the nameplate 79. When the actuator has been moved to another operating position, away from the operating head 71, the incidental light rays, as described hereinabove, will be scattered and not reflected outwardly of the device.

In view of these and many other possible embodiments and modifications, the invention is not intended to be limited to the showing herein, nor in any other manner, except as may be specifically required for its environmental adaptation.

We claim:

1. In an electrical device including an enclosed housing having an aperture, a stationary contact and a movable contact, said contacts being located internally of said housing, said movable contact movable from one contact operating position to another operating position; the combination therewith of visual indicating means for observing the operation of said movable contact externally of said housing, said visual indicating means including an elongated, solid indicator member disposed internally of said housing and having an end portion thereof seated in the housing aperture with its outer end surface exposed to incidental light rays emanating from an external light source and the opposite, internal end surface in facing relationship with a light reflecting surface conjointly movable with said movable contact transversely relative to said internal end surface, said indicator member arranged to transmit the incidental light rays from said outer end surface coextensive of its length to illuminate said internally located light reflecting surface and to transmit reflected light rays received from said reflecting surface outwardly of said housing to thereby provide a visual indication of position of the movable contact relative to the facing end surface of the indicator member.

2. In the electrical device of claim 1, wherein the device is a protective relay including a trip member for operating said movable contact and alternatively actuated from a first operating position to a second operating position under electrical overload conditions, and wherein said trip member includes as a portion thereof said light reflecting surface.

3. In the electrical device of claim 2, wherein said indicator member is relatively flat and the longitudinal axis of which is straight and alternative motion thereof is in a plane substantially normal to the internal facing end surface of said indicator member.

4. In electrical device of claim 1, wherein there is included an operating member conjointly operable with said movable contact and said light reflecting surface area is on said operating member.

* * * * *